UNITED STATES PATENT OFFICE.

FREDERICK G. BRAUND AND LOUIS J. VARGO, OF CLEVELAND, OHIO.

WELDING COMPOUND.

1,271,125.  Specification of Letters Patent.  Patented July 2, 1918.

No Drawing.   Application filed December 26, 1916.  Serial No. 138,926.

*To all whom it may concern:*

Be it known that we, FREDERICK G. BRAUND and LOUIS J. VARGO, citizens of the United States, residing at Cleveland, in the county of Cuyahoga and State of Ohio, have invented certain new and useful Improvements in Welding Compounds, of which the following is a specification.

This invention relates to welding compounds, and has for its object to provide an improved compound suitable for use in welding metals of different kinds or metals of the same kind. For example, the compound will weld brass, steel or cast iron, either with the same kind or with each other. Thus brass and steel, or brass and cast iron, or cast iron and steel, among different metals may be welded, with entirely satisfactory results, forming a permanent joint in any instance.

The compound consists of the following ingredients, preferably in the proportions indicated:

Bicarbonate of soda_____ 90%
    Boracic acid_____ 9%
    Ultra-marine blue_____ 1%

The bicarbonate of soda and boracic acid are ground and rolled into a fine powder and then thoroughly mixed with the blue. In the use of the compound, the two metals to be welded are first heated to about the fusion point, and then wire preferably of the same kind and grade of at least one of the metals to be welded, is dipped in the dry compound which adheres to the wire. The wire thus covered with the compound is placed in contact with the two surfaces to be welded, and the heat of the welding torch or the like is applied, to effect the weld.

The chemical action is as follows: The boracic acid unites with the metallic oxids which have been formed on the surfaces of the heated metals, producing clean metallic surfaces which readily unite to form the weld. This dissolution of the oxids and production of clean metallic surfaces is essential to a good weld. At the temperature employed in the weld, the sodium bicarbonate loses its extra molecule of carbonic acid, and this gas temporarily produces a protecting atmosphere or envelop of neutral gas around the joint, which protects the metallic surfaces from the oxidizing influence of the surrounding air. The monocarbonate of soda resulting from the action of the heat melts, and covers the surfaces of the clean metal, thereby still further and completely excluding the air by forming a liquid protective coating. In short, the boracic acid cleans the surfaces to be welded and the sodium bicarbonate acts to protect these clean surfaces from oxidation sufficiently long to enable a perfect weld to be made.

The action of the ultra-marine blue is not fully understood, but tests show that it produces a more favorable action when present in the mixture than when it is absent, the cause being obscure. It apparently serves to give a smoother finish to the joint, which may be hammered or pressed, as usual, during the operation.

What we claim as new is:

1. A soldering compound comprising a material capable of dissolving metallic oxids and another capable of producing a neutral envelop around the surfaces being joined at a temperature below the fusion point of the compound.

2. A welding compound containing boracic acid and sodium bicarbonate.

3. A welding compound consisting of boracic acid, sodium bicarbonate, and ultramarine blue, in substantially the proportions stated.

In testimony whereof, we do affix our signatures in presence of two witnesses.

FREDERICK G. BRAUND.
LOUIS J. VARGO.

Witnesses:
 JOHN A. BOMMHARDT,
 ROBERTSON BOWIE.